United States Patent [19]

Merkl

[11] 4,071,668

[45] Jan. 31, 1978

[54] ALUMINUM CONTAINING ALKENYLBENZENE RESIN

[76] Inventor: George G. Merkl, 46 Sunset Court, Haworth, N.J. 07641

[21] Appl. No.: 745,835

[22] Filed: Nov. 29, 1976

Related U.S. Application Data

[63] Continuation-in-part of Ser. No. 305,819, Nov. 13, 1972, abandoned.

[51] Int. Cl.$^2$ .................. C08F 30/04; C08K 5/16; C08G 2/00; C08G 69/44
[52] U.S. Cl. .................. 526/11.1; 260/45.7 R; 260/45.7 P; 260/45.7 ST; 260/45.75 W; 260/45.75 F; 260/45.9 R; 260/51 R; 260/67 R; 260/67.6 R; 260/75 R; 260/78 TF; 260/78 UA; 260/78 SC; 260/78.41; 526/191; 526/221; 526/240
[58] Field of Search ............ 260/2 M, 45.7 R, 45.7 P, 260/45.7 ST, 45.75 W, 45.75 F, 45.9 R; 526/11.1, 191, 240, 221

[56] References Cited

U.S. PATENT DOCUMENTS

| | | | |
|---|---|---|---|
| 3,054,787 | 9/1962 | D'Alelio | 526/191 |
| 3,062,856 | 11/1962 | D'Alelio | 526/11.1 |
| 3,136,667 | 6/1964 | D'Alelio | 260/2 M |
| 3,149,136 | 9/1964 | Bruce et al. | 260/2 M |
| 3,183,218 | 5/1965 | Werber et al. | 526/191 |
| 3,247,261 | 4/1966 | D'Alelio | 526/240 |
| 3,375,235 | 3/1968 | D'Alelio | 526/11.1 |
| 3,651,112 | 3/1972 | Sinn et al. | 260/2 M |

FOREIGN PATENT DOCUMENTS

| | | | |
|---|---|---|---|
| 37-6743 | 6/1960 | Japan | 526/191 |
| 4,222,696 | 11/1967 | Japan | 526/191 |

*Primary Examiner*—Herbert J. Lilling

[57] ABSTRACT

Aluminum-containing resins are produced by reactively contacting resin-forming monomers in the presence of aluminum metal which has been activated by permeation of high purity aluminum with mercury, gallium or an alloy of indium and gallium. In certain cases a co-catalyst, such as a halogen, is utilized.

8 Claims, No Drawings

ALUMINUM CONTAINING ALKENYLBENZENE RESIN

RELATED CASE

This application is a continuation-in-part of application Ser. No. 305,819, filed Nov. 13, 1972, and now abandoned.

FIELD OF THE INVENTION

The present invention relates to the formation of resinous materials through the use of an activated aluminum with novel chemical properties. Unlike conventional catalysts, the activated aluminum appears to enter into the polymerization reaction, creating aluminum bridges in the resin product.

SUMMARY OF THE INVENTION

The present invention is directed to the production of resinous materials obtained by reactively contacting one or more resin-forming monomers with an activated aluminum comprising aluminum metal, at least 99.9% by weight pure, which has been permeated with mercury, gallium or an alloy of indium and gallium in the presence of a source of hydrogen ions.

The present invention may be practiced on any monomeric organic compound that contains a plurality of reactive sites to form a resinous product. Such reaction sites are available in unsaturated compounds containing a terminal ($-CH=CH_2$) group, polyfunctional alcohols, polyfunctional amines, polyfunctional carboxylic acids and monofunctional unsaturated carboxylic acids, among others.

The present invention is particularly applicable to the preparation of the following types or classes or resin materials and, in the following description the method of the present invention will be specifically described with reference thereto:

A. polystyrene and related polymers obtained by the polymerization of styrene and related alkenyl benzene compounds;
B. phenolic resins i.e., the polycondensation reaction product of phenol and formaldehyde;
C. melamine resins i.e., the polycondensation reaction product of melamine and formaldehyde;
D. linear polyamide resins i.e., nylon-type resins prepared by the polycondensation reaction of a polyfunctional carboxylic acid and a polyfunctional amine;
E. saturated polyesters, i.e., those resins obtained by the reaction of an aromatic dicarboxylic acid, or an anhydride thereof, with a polyfunctional alcohol; and
F. acrylic resins i.e., the polymerization product of acrylic acid, methacrylic acid or acrylonitrile.

The activated aluminum used in the present invention serves a two-fold purpose. First, the activated aluminum acts as a catalyst in the resin forming reaction. Secondly, and unlike a typical catalyst, the activated aluminum enters into the resin forming reaction by providing a source of aluminum that is incorporated into the resin product. Thus, the resins produced by the invention contain aluminum bridges within the polymeric structure.

When a carboxylic acid is employed as one or more reactants in preparing the resins in accordance with the present invention the polymerization reaction is preferably carried out in an aqueous medium. In such aqueous medium the activated aluminum has the effect of liberating hydrogen, accompanied by dissolution of the aluminum, thereby providing active hydrogen and aluminum ions to take part in the polymerization reaction, resulting in the presence of aluminum bridges with the resin structure. Where the activated aluminum does not dissolve in the polymerization reaction medium such as in the polymerization of styrene to produce polystyrene, a second catalyst is utilized, such as a halogen e.g. HCl, HBr, chlorine gas, bromine gas or iodine gas, to initiate the dissolution of the aluminum in the styrene monomer so as to develop the aluminum ions which enter into the structure of the formed resin product.

The use of a co-catalyst material such as a halogen acid or gas and/or a phosphorus compound also tends to allow the production of a final resin product which has improved fire retardant properties. Improved fire retardant properties are achieved absent such co-catalyst, however, in view of the incorporation of the aluminum bridges within the resin structure. Generally it has been observed in accordance with the present invention that the resins produced by the method of the present invention have improved properties over those obtained with conventional catalysts, with additional mechanical properties being associated with the aluminum bridges within the resin structure.

DESCRIPTION OF PREFERRED EMBODIMENT

The present invention is based on the finding that resinous materials may be prepared from certain monomeric chemical compounds utilizing an activated aluminum which functions as a catalyst i.e. it promotes the resin-forming reaction, but which unlike a classical catalyst, also takes part in the resin-forming reaction.

Thus, the present invention provides a method of preparing a resinous material comprising reactively contacting a resin-forming reactant which comprises one of the chemical compounds or mixtures of compounds (A) - (H) below with an activated aluminum comprising aluminum metal, at least 99.9% by weight pure, which has been permeated with mercury, gallium or an alloy of indium and gallium in the presence of a source of hydrogen ions:

A. an alkenylbenzene;
B. formaldehyde and phenol;
C. formaldehyde and melamine;
D. a polyfunctional carboxylic acid and a polyfunctional amine;
E. an aromatic dicarboxylic acid, or the anhydride thereof, and a polyfunctional alcohol;
F. acrylonitrile;
G. acrylic acid; or
H. methacrylic acid.

In the practice of the present invention, it is preferred that the resin forming reactant be selected from the foregoing list. However, resin products may also be formed with any monomeric organic compound containing a plurality of reactive sites. Such plurality of reactive sites is available in unsaturated compounds containing a terminal ($-CH=CH_2$) group, polyfunctional alcohols, polyfunctional amines, polyfunctional carboxylic acids and monofunctional unsaturated carboxylic acids, among others.

As used herein, the term "monofunctional" means an organic material that contains one chemically active reaction site. As further used herein, the term "polyfunctional" means an organic material that contains two or more chemically active reaction sites.

As has been previously mentioned, an activated aluminum is an essential element for the practice of the present invention. Although the chemical structure and ensuing chemical properties of the activated aluminum are not fully understood, it is known that the activated aluminum acts as a "classical" catalyst in the polymerization reactions described herein. That is, the activated aluminum promotes the polymerization reactions to such an extent that they will occur with little regard to reaction conditions. Additionally, it appears that the activated aluminum may also act as an "initiator" to cause a reaction to occur that but for the activated aluminum would not otherwise result in a resinous product.

Unlike traditional catalytic systems, however, the activated aluminum also enters into the resin producing reaction. Thus, it should be fully comprehended that the resins produced by the practice of this invention have aluminum bridges incorporated into their chemical structures.

With the above in mind, the reactants employed in the practice of the present invention are discussed below with attention being given to the nature of the resinous product formed by the reactions described herein.

Activated Aluminum

A key reactant in the preparation of the resin products of the present invention is a first metal, e.g., aluminum metal, which has been activated through permeation by a second metal, i.e., a liquid metal selected from mercury, gallium and indium/gallium alloys. By "activated" is meant that the inter-crystalline structure of the aluminum is made uniquely and exceptionally receptive to chemical reaction. A more thorough description of the aluminum activation technique as well as an explanation of the physiochemical phenomena which occur during activation is contained in applicant's U.S. Pat. No. 3,993,595 issued Nov. 23, 1976, which is hereby incorporated by reference.

Basically, activation of the aluminum is carried out by wetting the surface of the aluminum in the presence of a source of hydrogen ions (protons), such as hydrochloric acid, with a liquid second metal selected from mercury, gallium and indium/gallium alloys until the aluminum has been permeated with the second metal. Evidence has been developed to establish that during this permeation of the aluminum the grain boundaries of the aluminum are actually penetrated by atoms of the second metal. This appears to create a realignment of the aluminum grain boundaries which has the effect of opening up the domains within the aluminum metal, resulting in unique reactivity properties.

The activated aluminum which is utilized in the process of the present invention shows many unique characteristics when compared with the base untreated aluminum metal. One of these is the dissolution of the aluminum and release of hydrogen ions or protons when placed in a liquid medium containing a source of hydrogen ions, i.g., water. It is this feature which is taken advantage of in certain embodiments of the present invention and which allows for the production of certain novel resin products with the activated aluminum.

In preparing the activated aluminum, aluminum metal in the form of relatively small rods or bars, preferably substantially free of bends and twists, is generally utilized. Preferably, soft aluminum metal having a purity of at least 99.9% by weight is used. The use of an aluminum metal with a substantial percentage of impurities is disadvantageous in the present invention in that activation requires substantially longer periods of time. More importantly, there is the tendency for the impurities to enter into and precipitate from the subsequently formed products. Generally, however, the impurities are leached from the aluminum during extended periods of activation.

Using as an example the aluminum-mercury system, activation of the aluminum can be effectively carried out by floating an aluminum bar or rod on mercury in the presence of a hydrogen ion donating medium. This hydrogen ion donating medium can be an aqueous inorganic or organic acid, an aqueous alkaline solution or an alcohol, etc. In principle, any hydrogen ion source of hydrogen ion donating medium can be utilized. It is hypothesized that the mercury is caused to penetrate and diffuse through the aluminum in the form of a stable hydride formed in situ by the reaction between the mercury metal and hydrogen ions of the hydrogen ion donating medium. The ability of mercury, gallium and indium/gallium alloys to act in a similar fashion appears to be associated with the hydride-forming capabilities of these metals and the fact that each of these metals has an atomic volume similar to that of hydrogen itself. This allows the metals to penetrate and diffuse through the aluminum either together with hydrogen or in the form of the hydride.

As will be apparent to those skilled in this art, the length of time required for activation of the aluminum with mercury will depend upon many factors, including the exposed surface area, which is related to the hardness of the aluminum, and the amount of impurities present in the aluminum. Longer times are required for harder aluminums and those with greater impurity contents. As a general rule, adequate activation of aluminum rods with mercury can be achieved in a time period of from about 2 hours to about 24 hours. When utilizing a preferred soft grade of aluminum, activation can be achieved in a period of from 8 to 12 hours.

When the aluminum is activated, it becomes embrittled and can be easily broken, using a snapping action. By breaking the aluminum and examining the grain structure at the break, one can determine the degree to which the mercury has penetrated and diffused throughout the aluminum. In accordance with the preferred embodiment of the present invention, the desired products are prepared utilizing activated aluminum in which the mercury, gallium, or indium/gallium alloy has penetrated and diffused entirely throughout the aluminum structure.

In forming the activated aluminum, high temperatures should be avoided since high temperatures appear to prevent grain structure realignment due to lattice expansion. Generally, the activation of aluminum with mercury can be carried out under ambient temperature conditions, with a temperature in the range of from 40° to 100° F being preferred. When utilizing gallium as the second metal, it is often desirable to gently heat the gallium in order to maintain the gallium in the liquid state, thereby allowing the permeation to more effectively take place. Here again, however, excessive temperatures should be avoided.

When forming the activated aluminum using gallium or an indium/gallium alloy, the permeation and diffusion of the gallium or indium/gallium through the aluminum rod may be initiated merely by contacting one end of the aluminum rod with the second metal or metals in the presence of the hydrogen ion donating medium. The initiation of diffusion may be observed by noting the surface wetting of the aluminum with the second metal or metals above the point of contact. Further diffusion of the gallium or indium/gallium alloy through the entirety of the aluminum can then be continued by placing the aluminum rod in an anhydrous organic liquid such as alcohol, or the like, which is capable of donating hydrogen ions for effecting further diffusion.

With respect to the indium/gallium alloys which may be used, essentially any alloy composition will be suitable, ranging from 90% by weight gallium and 10% by weight indium to 10% by weight gallium and 90% by weight indium. When employing such alloy, however a 50:50 weight mixture of gallium and indium is extremely effective. As the percentage of indium is increased in the indium/gallium alloy, there is an increasing tendency for the activated aluminum to disintegrate, particularly when in an aqueous environment. This does not prevent production of the desired resin products of the present invention, but merely slightly complicates withdrawal of unreacted activated aluminum from the reaction medium.

The amount of mercury, gallium or indium/gallium alloy which penetrates and diffuses through the aluminum will depend, of course, upon the length of treatment, temperature of treatment and the ability of the aluminum to retain the second metal or metals. As previously mentioned, it is preferred in accordance with the present invention to employ an activated aluminum in which the mercury, gallium or indium/gallium alloy has penetrated entirely through the aluminum. Aluminum which has been "totally" activated in this manner dissolves with the greatest efficiency under the process conditions of the present invention.

Generally, a soft aluminum will pick up and retain a maximum of about 5% by weight of mercury during the activation process, with typical pickups being in the 2.5 to 3.5% by weight range. This amount of mercury is very effective to achieve the desired results of the present invention. Even with much smaller amounts of mercury, however, e.g., amounts as low as 0.1%, the aluminum becomes activated and can be used to produce the resins of the present invention. It is preferred, however, to operate with a mercury content within the above specified range of about 2.5% to about 3.5% by weight.

It has generally been found that an aluminum activated with gallium or indium/gallium alloy is more active than the mercury-activated aluminum. For this reason, the amount of gallium or indium/gallium required to achieve suitable activation is less than the amount of mercury required. Generally, the aluminum will pick up and retain a maximum of about 3% by weight gallium or indium/gallium alloy. However, suitable activation can be achieved with as little as about 0.05 to about 1.0% by weight gallium or indium/gallium alloy and it is preferred to utilize an amount in this range. However, it has been found that even with amounts of these metals as low as 0.01% by weight, very active aluminum effective for the process of the present invention can be provided.

Resin-Forming Materials

The second key reactant in the practice of the present invention is a resin-forming monomer or a mixture of several such monomers. In this regard, "resin-forming monomer" means those monomeric materials which when reacted or otherwise placed into intimate contact with an activated aluminum form a resin. The term "resin" is meant to include macro-molecular materials obtained by one of the following types of polymerization reactions: radical, ionic, addition or condensation polymerization.

The resin-forming materials preferred for the practice of this invention may be chosen from:

A. an alkenylbenzene. An alkenylbenzene is the general name given a class of materials having an unsaturated aliphatic chain attached to a benzene ring. The simplest alkenylbenzene is styrene. For the practice of the present invention, it is preferred that the double bond in the unsaturated aliphatic chain be conjugated with the benzene ring thus providing a reaction site for free radical polymerization. A preferred alkenylbenzene for the practice of the present invention is styrene;

B. formaldehyde and a phenol. Phenol is the generic name for compounds of the general formula ArOH, where Ar is phenyl, substituted phenyl or an aryl group such as naphthyl. For the present invention, a preferred phenol is hydroxybenzene;

C. formaldehyde and melamine. Melamine is a name generally given to 2,4,6-triamino-1,3,5-triazine;

D. a polyfunctional carboxylic acid and a polyfunctional amine. A polyfunctional carboxylic acid is an organic compound containing a plurality of carboxyl groups; a polyfunctional amine is an organic compound containing a plurality of amino groups. Nonlimiting examples of polyfunctional carboxylic acids capable of being utilized in the practice of the present invention include adipic acid, phthalic acid, citric acid and hexanedioic acid. Representative nonlimiting examples of polyfunctional amines include hexamethylene diamine and ethylene-diamine;

E. an aromatic dicarboxylic acid, or the anhydride thereof, such as phthalic acid, phthalic anhydride or terephthalic acid and a polyfunctional alcohol such as ethylene glycol;

F. acrylonitrile;

G. acrylic acid; or

H. methacrylic acid.

Generally, the foregoing list of preferred resin-forming materials can be more broadly described as belonging to the chemical class comprising polyester, phenolic-, polyamide-, and acrylic- type resin classes.

These resin classes will now be more specifically described with reference to exemplary resin-forming materials existing within each resin class.

Polyester Resin

Polyester resins are a subclass of the alkyd resins but have found such wide applications that these resins must be highlighted in terms of the present invention.

Generally a polyester resin may be formed by the polycondensation of dicarboxylic acids with a dihydroxyl alcohol. Unlike the broad class of alkyd resin, a polyester resin is usually not modified by a fatty acid or drying oil. Typical nonlimiting reactants for producing a polyester resin are (1) a glycol such as ethylene-, propylene-, diethylene-, dipropylene-, or butylene glycol; and (2) an acid or anhydride thereof such as adipic acid, azelaic acid, terephthalic acid or phthalic anhydride.

Phenolic Resins

Resinous phenolic compounds are a class of resins formed by the reaction of phenols with aldehydes such as formaldehyde, acetaldehyde or furfural aldehyde. Perhaps the most widely used phenolic resins are prepared by reacting phenol with formaldehyde.

Polyamide Resins

Polyamide resin is the name given to all long-chain polymides which have recurring amide groups (—COHN—) as an integral part of the main polymer chain.

Generally an unsaturated monofunctional carboxylic acid such as linoleic acid or a polyfunctional carboxylic acid such as adipic acid or sebacic acid may be condensed with a polyfunctional amine such as ethylene diamine in the presence of an activated aluminum to produce a polyamide resin.

Representative examples of polyamide resins would include Nylon 66, formed by condensing hexamethylenediamine with adipic acid; Nylon 610, formed by condensing hexamethylenediamine with sebacic acid; and Nylon 12 made by the polymerization of dodecanoic lactam, and having 11 methylene units between the linking —NH—CO— groups in the polymer chain.

Polystyrene Resin Class

Polystyrene is the polymerization product of styrene.

Styrene may be reacted with other organic materials to form copolymers with commercial utility. For example, SAN polystyrene resin is formed by a copolymerization reaction of styrene and acrylonitrile. The resulting product has increased chemical resistance. Another copolymer product of established importance is ABS polystyrene, formed by copolymerization of acrylonitrile, butadiene and styrene.

Acrylic Resin Class

Acrylic resins are generally prepared from a vinyl-type monomer, i.e. one containing a

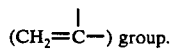
$(CH_2=\overset{|}{C}-)$ group.

Common monomers used to prepare the resinous material include acrylic acid, methacrylic acid, methyacrylate, acrylonitrile, acrylamide, acrolein and acrylaldehyde

Optional Reactants

Fire Retardant Additives

The method of the present invention may also be practiced to produce resin materials having improved fire retardant properties. Generally, the chemistry of fire retardants centers around six elements: phosphorous, antimony, chlorine, bromine, boron and nitrogen.

In the absence of fire retardant additives containing one or more of the above listed elements, it is well established in the literature that the structural stability of the resin affects the fire retardant properties of the resin. In particular, it is reported that resin forming monomers tend to burn rapidly and, further, resins which easily decompose to monomers also tend to burn rapidly. Consequently, a resin which resists decomposition to monomeric materials tends to possess some inherent fire retardant characteristics.

In the practice of the present invention, it is found that resins which have incorporated aluminum from the activated aluminum into their structure have increased fire retardant properties over that displayed by similar resins formed without the incorporation of aluminum.

Generally, it has been established that, in the practice of the present invention, the following ions satisfactorily impart fire retardant properties: $Br^{-1}$, $Cl^{-1}$, $I^{-1}$, $P^{-3}$, $S^{-2}$, $F^{-1}$, $Si^{-4}$ and $OH^{-1}$. For example, an acrylic resin prepared with an excess of water present results in a resin containing a high concentration of $OH^{-1}$ ions and thereby exhibits improved fire retardant properties.

The incorporation of these ions into the resin is easily obtainable by simply providing a source of the appropriate ions in the reactant solution. For example, sulfur ions may be introduced into a resin by adding ammonium sulfate, $(NH_4)_2 SO_4$, to the reactants prior to or during the polymerization reaction, phosphorus ions may be introduced by use of $H_3PO_4$, $POCl_3$, $P_4O_4Cl_{10}$ or $PCl_5$; chloride or bromide ions may be introduced by streams of $Cl_2$ or $Br_2$ gas or by using $ZnCl_2$, $ZnBr_2$, $MgCl_2$, $MgBr_2$, $TiCl_2$ or $NH_4Br$.

Reaction Parameters

Generally, the reaction parameters required to practice the present invention are exceedingly simple. It is only necessary to place the reactant compounds into contact with the activated aluminum and thereafter heat the reaction solution to near its boiling point for the polymerization reaction to occur. For example, polymerization, in accordance with the invention, is carried out by simply placing the reactants and the activated aluminum in an open vessel and thereafter heating the reactant solution to near its boiling point. Care is taken, however, to assure that the solution is not boiled.

When utilizing an acid monomer in the method of the present invention it is preferred to carry out the polymerization reaction in an aqueous medium. The use of such aqueous medium therefore is applicable for the preparation of acrylic resins, polyester resins, polyamide resins, etc. When utilizing such aqueous medium as the polymerization or reaction medium in accordance with the present invention, the activated aluminum when placed in the aqueous medium tends to disassociate the water, liberating hydrogen, accompanied by dissolution of the aluminum metal, and, as a result formation of an environment which is conducive to the rapid polymerization of the monomeric component or components. The use of the aqueous medium will also provide for the preparation of a resin product which has a high water content. It has been surprisingly found, however, in accordance with the present invention that notwithstanding such high water content, the resins produced in accordance with the present invention retain stable mechanical properties, presumably due to the nature of the resins produced by use of the activated aluminum in accordance with the present invention, including the presence within the resin structure of aluminum bridges.

With respect to resin formation reactions which are not advantageously carried out in an aqueous environment, such as the polymerization of styrene, it may be necessary to add to the polymerization system a co-catalyst material to assist the activated aluminum in dissolving in the reaction system, thereby providing aluminum ions for introduction into the resin structure. Where the activated aluminum does in fact dissolve, even to a slight extent in the reaction system, the use or a co-catalyst is generally not necessary, although further acceleration of the resin forming reaction can be achieved utilizing such co-catalyst. Furthermore, some of the co-catalysts contemplated in accordance with the present invention can provide additional properties to the resins produced by the method of the present invention, including for example increased fire proofing characteristics.

Specifically with respect to the polymerization of styrene it has been determined in accordance with the present invention that a co-catalyst should be utilized. Preferred co-catalysts for styrene polymerization are halogens, either in the form of a halogen acid such as HBr or HCl or a halogen gas such as chlorine gas or bromine gas. The use of such halogens tends to create the proper environment for the dissolution of the activated aluminum within the styrene monomer to effect the desired polymerization.

With respect to styrene polymerization it has been discovered in accordance with the present invention that the polymerization proceeds extremely rapidly, even more rapidly than can be achieved with conventional catalyst systems and, the styrene can be effectively polymerized to solid polystyrene in a matter of seconds. It has been observed that a skin is first formed on the activated aluminum present in the styrene monomer and upon an increase in the temperature to approximately 50° C. the skin strips off and the monomer polymerizes quite rapidly. This rapid polymerization when utilizing the activated aluminum to the present invention can also be seen with respect to the other monomer types and classes enumerated above and the quick, efficient polymerization of the monomer system is an advantage associated with the use of the activated aluminum in accordance with the present invention.

Although the polymerization reaction occurs with little regard to the physical conditions surrounding the reactive sites, it is important, under some circumstances, to monitor certain reaction parameters in order to control the chemical composition and physical characteristics of the resultant resins. These parameters include, without limitation, resin viscosity, reaction time, reaction temperature, reactant solution acidity, amount of activated aluminum consumed and reaction rate. As in most chemical reactions, these parameters are not exclusively independent but, in fact, show varying degrees of interdependence based upon the starting materials used to produce the final resinous product.

Prior to contact with the activated aluminum, it is preferred to thoroughly mix the reactant chemicals to assure a uniform solution of reactants exists. Thereafter, upon interaction of the reactants with the activated aluminum it is preferred to agitate the reaction medium, for example by stirring, to provide a continued supply of nonreacted reactants into the immediate vicinity of the activated aluminum. If such agitation is not provided it may be possible that the activated aluminum will react with one ingredient to form a sub-resin which will not react further to produce the desired resin. In other words if the reactants are not well mixed, it may be possible to produce two or more resins simultaneously. Of course if it is desired that the final resinous product be a mixture of two or more resins produced simultaneously this may easily be accomplished by purposefully inadequately mixing the reactants and not providing agitation during the polymerization reaction.

Resin viscosity is a measure of the extent to which polymerization has occurred in the reaction. The viscosity of the resin may be monitored during polymerization by removing small samples of the resin at various times and subjecting these samples to capillary flow tests. It is also possible to measure the viscosity of the resin by simply observing the thickening of the resin during the polymerization reaction. Resin viscosity may be of interest where, for example, the resin will be used for coating purposes. By monitoring the resin viscosity, the reaction can be stopped by removing the activated aluminum whenever the desired viscosity is achieved.

Usually it is not advisable to permit the reaction between the activated aluminum and the resin-forming reactants to proceed at too great a rate since a high viscosity resin may be formed in the vicinity of the activated aluminum thereby coating the activated aluminum and preventing continued formation of the resin. In this regard, it is preferred that the temperature of the reaction be monitored, either continuously or intermittently. Although the temperature at which high viscosity resins begin to coat the activated aluminum is different for each reaction system, such temperature can easily be determined by one skilled in the art through routine experimentation. Once this temperature is determined, it is possible to control the rate of the polymerization reaction by cooling the reaction system. Such cooling, performable, for example, by circulating cold water around the exterior of the reaction vessel, will inhibit the reaction rate without adversely affecting the resinous product.

Temperature monitoring produces additional benefits in the practice of the present invention. In many cases it is established that the addition of heat at the beginning of the reaction sequence will promote the reaction rate without harming the resins being produced. The degree of heating depends upon the resin being formed but, in general, where the resin forming chemical has a low viscosity, heat sufficient to maintain the temperature of the resin forming chemical or solution near its boiling point is adequate to increase the polymerization reaction rate without adversely affecting the chemical composition of the formed resin.

In the instances where heat is used to promote the polymerization reaction, it is preferred to remove the heat source when the reaction has proceeded to the point where the resin being formed tends to coat the activated aluminum. If the heat source is not removed the resin will coat the activated aluminum thereby tending to inhibit further polymerization.

The activated aluminum plays several roles in the polymerization process. First, it acts as a catalyst to initiate and thereafter speed up the polymerization reactions. Secondly, unlike a "classical" catalyst the activated aluminum itself enters into the reaction in varying degrees thereby providing a source of aluminum ions that are incorporated into the polymer structure.

Where the activated aluminum employed in the polymerization process of the present invention is high purity aluminum permeated with mercury, the mercury and aluminum appear to generate ultraviolet radiation which assists in the catalysis of the polymerization reaction. More importantly, the activated aluminum employed in accordance with the process of the present invention generates active hydrogen which appears to take part in the polymerization reaction. This active hydrogen which is generated through the employment of the activated aluminum appears responsible, in considerable part, for the effective polymerization which is achieved when carrying out the process set forth herein. It is this production of active hydrogen which distinguishes the activated aluminum of the present invention from typical aluminum catalysts employed in polymerization reactions.

With respect to the incorporation of aluminum into the resin structure as aluminum bridges, it has been determined in accordance with the present invention that up to about 5% by weight aluminum can be effectively incorporated into the resin structure. Generally, however, the amount of aluminum which is incorporated into the resin structure utilizing the activated aluminum in accordance with the present invention is from about 0.01 to about 2.0% by weight, with amounts of from about 0.01 to about 1% by weight being most common. Even such small amounts of aluminum incorporated into the resin structure, however, have a substantial effect on the mechanical properties of the resin which is prepared. Accordingly, the method of the present invention which involves the incorporation of a minor amount of aluminum into the resin structure provides for improved resin products not obtainable through conventional polymerization procedures utilizing commercially available catalysts.

EXAMPLES

The present invention will now be described by reference to the following specific examples. It must be recognized that these examples are given only to demonstrate the practice and effectiveness of the invention. These examples are not meant to, and should not be construed to, limit the invention to the specific examples set forth herein. Rather, these examples merely show the results obtainable through the practice of this invention by one skilled in the art.

The parts and percentages recited in the following examples refer to parts by weight and percentages by weight unless specifically provided otherwise.

EXAMPLE 1 — ALKENYLBENZENE

A. The preparation of a resin by the polymerization of styrene is investigated in this example. The reactant used is 90g of styrene. HBr is added as a co-catalyst for the polymerization reaction. The styrene and HBr are combined in the presence of mercury — activated aluminum. Heat is added to the reaction system to increase the polymerization reaction rate but the reactant solution is not permitted to reach its boiling point. The pH of the reactants is monitored by removing, at various times, samples of the reactant solution and titrating these samples with a standarized basic solution. The polymerization reaction is continued until no acid shows in the titration, at which time the activated aluminum is removed from the reaction vessel. A resinous material is formed by this procedure.

B. The procedure of Example 1A is repeated, first using Cl$_2$ gas and thereafter Br$_2$ gas, introduced to contact the activated aluminum. In each case an equivalent resin is produced.

EXAMPLE 2 — FORMALDEHYDE AND A PHENOL

The ability to form resinous materials by using formaldehyde and a phenol is considered. Table 1 lists the representative reactants used in this example.

TABLE 1

| Example Number | Formaldehyde | Other Reactants |
|---|---|---|
| 2A | 110 g | 121 g hydroxybenzene |
| 2B | 110 g | 121 g hydroxybenzene 20 g HBr |

In Example 2A, the reactants are combined in the presence of a mercury — activated aluminum in the form of a rod weighing 160 g and thereafter heated to near boiling. The product of the reaction is a resinous material.

In Example 5B, a resin of improved fire retardant qualities is formed by combining the reactants of this example in the presence of a mercury — activated aluminum rod weighing 160 g. The reaction solution is heated to near boiling. The HBr is in the form of a 1N aqueous solution. The resin produced in this example is water soluble.

EXAMPLE 3 — FORMALDEHYDE AND MELAMINE

In this example 3 g formaldehyde are combined with 126 g melamine in the presence of a mercury — activated aluminum in the form of a rod weighing 54 g. The reactant solution is heated to near its boiling point. The product of the reaction is a resinous material.

EXAMPLE 4 — -POLYFUNCTIONAL CARBOXYLIC ACID AND A POLYFUNCTIONAL AMINE.

A resinous material is prepared by the reaction of a polyfunctional carboxylic acid, or a monofunctional unsaturated carboxylic, with a polyfunctional amine in the presence of mercury — activated aluminum. Table 2 shows representative reactants and their amounts used to produce the resins of this example.

TABLE 2

| Example Number | Acid | Amine | Other Reactants |
|---|---|---|---|
| 4A | 146g adipic acid | 116g diaminohexane | — |
| 4B | 146g adipic acid | 116g diaminohexane | 15 g HBr |
| 4C | 120g adipic acid | 100g hexamethylenediamine | 35g formaldehyde, 105g methanol |
| 4D | 120g sebacic acid | 105g hexamethylenediamine | — |
| 4E | 120g sebacic acid | 105g hexamethylenediamine | 30g HCl |

In Example 4A, the reactants are combined in the presence of mercury — activated aluminum rod weighing 54 g. Heat is thereafter applied to the reaction system to promote the reaction but the reactants are not allowed to boil. The reaction continues until a titration of a portion of the reactants shows no free acid remaining in the reaction. The reaction is stopped by removing the activated aluminum from the reaction vessel. The product of this reaction is a resinous material.

A resin of improved fire retardant properties is produced in Example 4B when the reactants of this example are combined in the presence of a mercury — activated aluminum rod weighing 54 g and thereafter heated to near boiling. The HBr is in the form of a 1N aqueous solution. The resin so produced is water-soluble.

The resin formed in Example 4C is prepared by combining the reactants of this example in the presence of mercury — activated aluminum and heated.

In Example 4D, the reactants are combined in the presence of mercury — activated aluminum to produce a resinous material. The reaction solution is heated to near boiling to promote resin formation.

The resin of Example 4E is formed by combining the reactants of this example in the presence of a mercury — activated aluminum and then heating the reaction solution. The HCl is in the form of a 1N aqueous solution. The resulting resin is water-soluble.

EXAMPLE 5 — POLYFUNCTIONAL ALCOHOL AND THE ANHYDRIDE OF AN AROMATIC DICARBOXYLIC ACID

A. In this Example, 50 g of phthalic anhydride are mixed with 150 g of ethylene glycol. The mixture is then placed in a reaction vessel containing a mercury — activated aluminum in the form of a rod of about 3 inches in length and ½ inch in diameter. Heat is added to the reaction vessel to increase the reaction rate but the temperature of the solution is not permitted to reach its boiling point. The pH of the reaction is monitored by periodically removing a small sample of the solution and titrating this sample with a standardized basic solution. The reaction is permitted to continue until no free acid appears to be present in the solution, at which time the activated aluminum is removed from the reaction vessel. The reaction time is from 10 to 15 minutes. A resin is produced by this procedure.

B. Example 5A is repeated with the addition of 50 g of an aqueous solution of an inorganic acid. The inorganic acids for this example are 1N HCl, 1N HBr and 1N $H_3PO_4$.

By way of example 50 g of phthalic anhydride, 150 g of ethylene glycol and 50 g of 1N HCl are mixed and added to the reaction vessel containing mercury — activated aluminum. Heat is applied to increase the reaction rate but the solution is not permitted to boil. The pH is monitored as in Example 5A and the reaction is stopped when the results of titration show no free acid present in the reaction solution. The resinous product is water-soluble and after drying is exposed to a flame to investigate the fire retardant properties of the resin. This procedure is repeated twice, first with replacement of the 1N HCl reactant with 1N HBr and second, replacement of 1N HCl with 1N $H_3PO_4$. As a result three water-soluble resins of improved fire retardant qualities are prepared with the phthalic anhydride-ethylene glycol system.

EXAMPLE 6 — POLYFUNCTIONAL ALCOHOL AND AROMATIC DICARBOXYLIC ACID

A resinous material is prepared by the reaction of a polyfunctional aromatic carboxylic acid with a polyfunctional alcohol. Some 121 g of terephthalic acid are combined with 61 g of ethylene glycol in the presence of a mercury — activated aluminum in the form of a rod weighing 54 g and the solution is thereafter heated to near boiling to promote resin formation.

EXAMPLE 7

Example 6 is repeated with the addition of 5 g of 1N HBr. A water soluble resin of improved fire retardant properties is obtained.

What is claimed is:

1. A method of preparing an aluminum containing resin which comprises:
   contacting and reacting under resin promoting conditions
   I. activated aluminum comprising high purity aluminum metal activated through permeation with a metal selected from mercury, gallium and indium/gallium alloys and
   II. a resin forming alkenylbenzene monomer system
   said activated aluminum being present in an amount effective to catalyze the resin formation and to introduce into the formed resin up to 5.0% by weight aluminum; and
   terminating the resin formation reaction by withdrawing unreacted aluminum from the reaction system.

2. The method of claim 1 wherein said activated aluminum is mercury permeated aluminum containing from 0.1 to 5% by weight mercury.

3. The method of claim 1 wherein said resin forming monomer (II) is styrene and a halogen co-catalyst is introduced into the reaction system.

4. The method of claim 3 wherein said halogen catalyst is selected from HCl, HBr, chlorine gas and bromine gas.

5. The method of claim 1 wherein the resin forming reaction is carried by heating the resin forming monomers to below their boiling point.

6. The method of claim 1 further including introducing into the reaction system a fire retardant additive.

7. The aluminum containing resin prepared by the method of claim 1.

8. The aluminum containing resin produced by the method of claim 6.